UNITED STATES PATENT OFFICE.

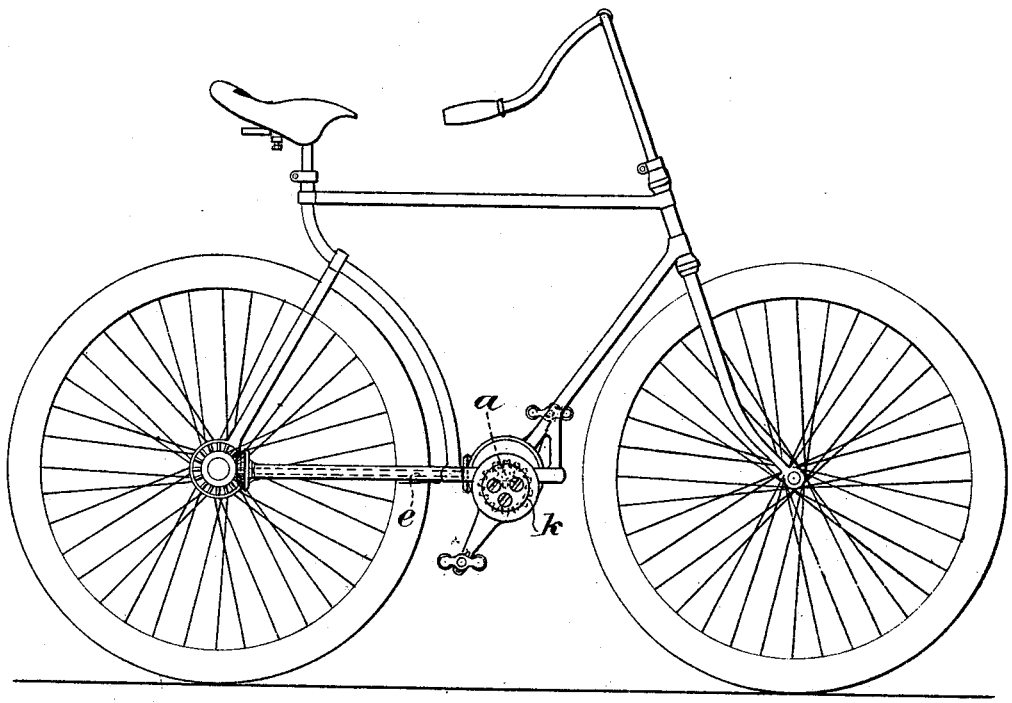

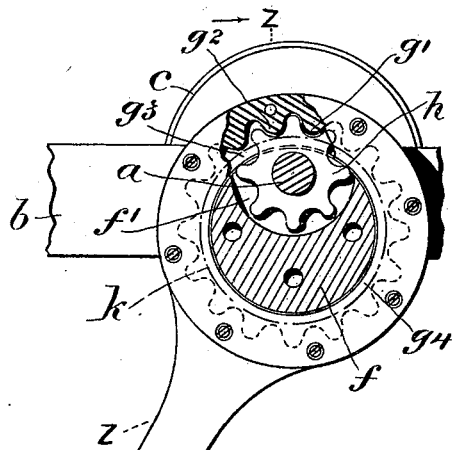
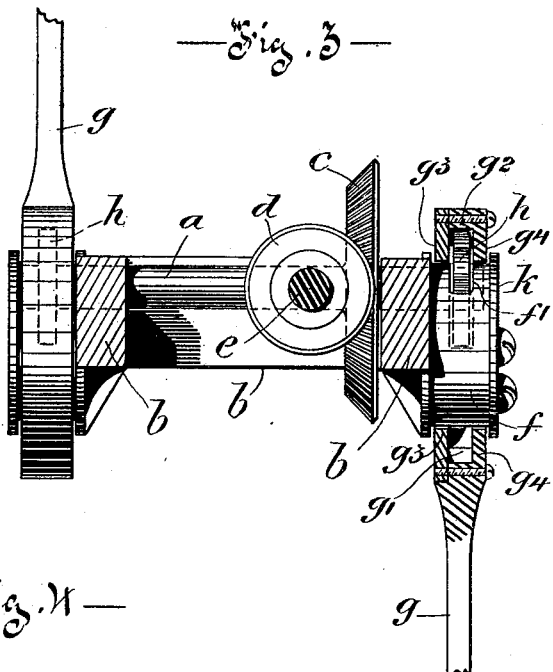
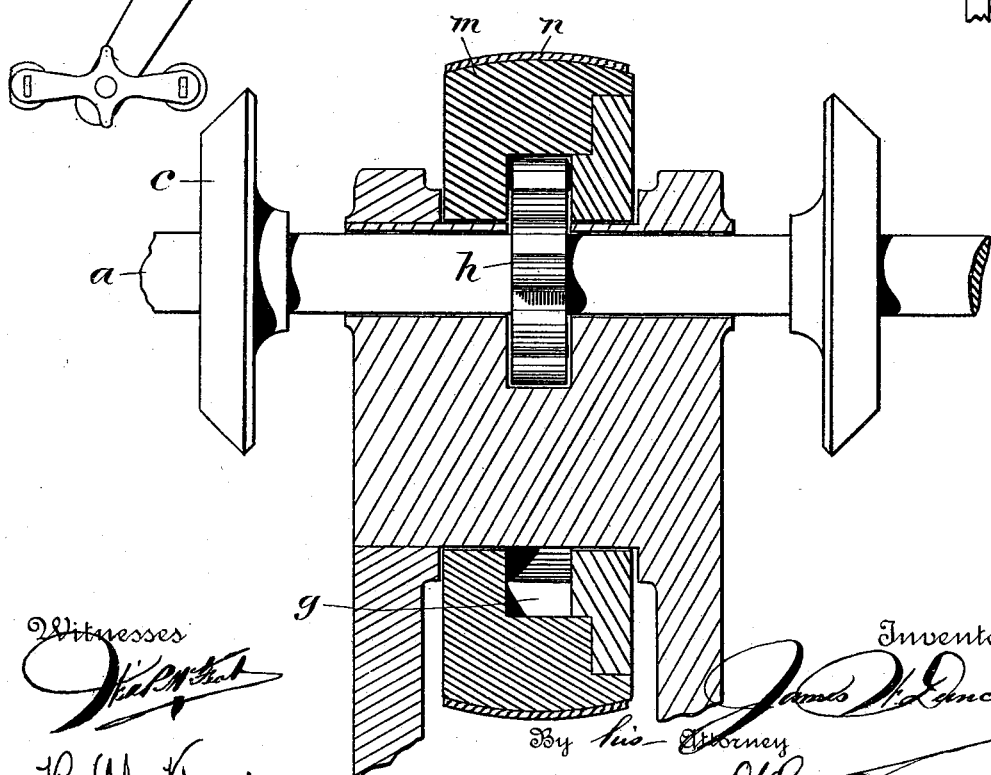

JAMES W. DUNCAN, OF MONTREAL, CANADA.

DRIVING-GEAR FOR BICYCLES.

SPECIFICATION forming part of Letters Patent No. 549,478, dated November 5, 1895.

Application filed November 9, 1894. Serial No. 528,349. (No model.)

*To all whom it may concern:*

Be it known that I, JAMES WILLIAM DUNCAN, of the city of Montreal, in the district of Montreal and Province of Quebec, Canada, have invented certain new and useful Improvements in Driving-Gear for Bicycles and the Like; and I do hereby declare that the following is a full, clear, and exact description of the same.

This invention relates to means for securing a faster rotation of the usual driving-wheel or sprocket of a bicycle or of similar driving-gear usually operated by a crank and provides an arrangement whereby the speed of rotation of the initial operating part or crank and the usual sprocket or driving wheel rotated by it is considerably augmented.

In the drawings hereunto annexed and forming part of this specification, Figure 1 is a side elevation of a bicycle provided with my improved running-gear; Fig. 2, a side elevation of the operating parts with retaining-plate removed and hub of crank partly broken away; Fig. 3, a longitudinal section of the operating parts on line Z Z, Fig. 2; and Fig. 4, a detail longitudinal section similar to Fig. 3, but showing a different form of initial operating part.

I have chosen to show my invention as applied to the running or operating gear of a bicycle; but it will be readily understood that its application is not confined to such mechanism, since by changing the form of the initial operating part it can be used in connection with shafting and rotary mechanism and devices of various kinds.

$a$ is the usual transverse crank axle or shaft of a bicycle-operating gear, in this case shown as composed of bevel gear-wheels and shafting instead of sprocket-wheels and drive-chain. This axle $a$ is carried in bearings in the frame of the machine and carries a bevel gear-wheel $c$, adapted to intermesh with a similar wheel $d$ on the shaft $e$, running rearward to operate through other gear connections the hind wheel of the bicycle.

Each end of the shaft $a$ passes eccentrically through a solid bearing $f$, projecting laterally from the side of the frame, on which solid bearing the hub of the crank or cranks $g$ or other initial operating part is mounted to revolve.

The hub of the crank or other initial operating part is constructed to present an internal periphery or face carrying gear-teeth $g'$, preferably formed on a ring-piece $g^2$, inclosed by two side pieces $g^3$ $g^4$; or such ring can be formed in one with the outer $g^4$ of the side pieces, in one with which ring and side piece the crank-arm proper is also preferably formed and the whole secured together in any desirable way. The side pieces are centrally perforated to fit the bearing $f$ and this latter is cut away, as at $f'$, to accommodate a pinion $h$, rigidly mounted on the shaft $a$ and in intermeshing relation with the gear-teeth $g'$ of the crank.

The parts are held in place, preferably, by means of an outer retaining-plate $k$, secured in any desirable way to the end of the bearing $f$.

In Fig. 4 I have shown the initial operating part in the form of a pulley $m$, the hub portion of the crank furnishing all the essential parts when rotation is secured by means of a driving-belt such as indicated in section at $n$.

What I claim is as follows:

1. In driving gear for bicycles and the like, the combination with the supporting frame and axle or part to be rotated, of a solid journal bearing projecting from said frame, an eccentric recess in said journal having an opening centrally of the width of the periphery thereof leaving solid continuous bearing surfaces of the same diameter on each side of same, the axle or part to be rotated passing through the bearing and eccentric space therein, a pinion rigidly mounted on said axle within said space, and the crank or initial operating part mounted evenly on each of the continuous bearing surfaces of the bearing and being centrally toothed to engage said pinion, and a retaining plate secured to the end of said journal bearing for the purpose set forth.

2. The combination with the frame, of axle $a$, suitably supported, a bearing $f$, in one with the frame and projecting laterally therefrom, an eccentric recess $f'$ in said bearing having an opening centrally of the width of the periphery thereof and leaving continuous bearing surfaces on each side of same, the axle passing eccentrically through such bearing and through the recess therein, pinion $h$ rigidly mounted on said axle within said space; the hub of a crank composed of side pieces $g^3$, $g^4$, centrally perforated and mounted to revolve on the bearing surfaces of said bearing, and ring piece $g^2$ bolted together and the latter having gear teeth on its inside face to intermesh with said pinion; and a retaining plate $k$ secured to the end of said bearing for retaining the parts in place, for the purpose set forth.

Montreal, 2d day of November, 1894.

JAMES W. DUNCAN.

In presence of—
FRED. J. SEARS,
R. A. C. HIMLER.